United States Patent [19]
Potter

[11] Patent Number: 5,215,733
[45] Date of Patent: Jun. 1, 1993

[54] MANUFACTURE OF SILICA GELS USING SHEAR TO REDUCE THE PARTICLE SIZE PRIOR TO WASHING WITH A HYDROCYCLONE

[75] Inventor: John K. Potter, Wirral, England

[73] Assignee: Unilever Patent Holdings B.V., Rotterdam, Netherlands

[21] Appl. No.: 642,568

[22] Filed: Jan. 18, 1991

Related U.S. Application Data

[63] Continuation of Ser. No. 331,097, Mar. 27, 1989, abandoned, which is a continuation of Ser. No. 41,910, Apr. 24, 1987, abandoned.

[30] Foreign Application Priority Data

Apr. 25, 1986 [GB] United Kingdom ............... 8610118

[51] Int. Cl.$^5$ .............................................. C01B 33/16
[52] U.S. Cl. .................................. 423/338; 252/315.6
[58] Field of Search ............... 423/338, 335; 502/233; 252/315.6

[56] References Cited

U.S. PATENT DOCUMENTS

| | | | |
|---|---|---|---|
| 3,607,777 | 9/1971 | Winyall et al. | 423/338 |
| 3,652,215 | 3/1972 | Aboutboul et al. | 423/338 |
| 3,709,664 | 1/1973 | Krekeler et al. | 423/338 |
| 3,800,031 | 3/1974 | Sale et al. | 423/338 |
| 3,872,217 | 3/1975 | Merz et al. | 423/338 |
| 4,001,379 | 1/1977 | Türk et al. | 423/339 |
| 4,595,578 | 6/1986 | Cohen et al. | 423/338 |
| 4,640,807 | 2/1987 | Afghan et al. | 423/338 |

FOREIGN PATENT DOCUMENTS

| | | |
|---|---|---|
| 1667078 | 5/1971 | Fed. Rep. of Germany. |
| 2011162 | 2/1970 | France. |
| 1284087 | 8/1972 | United Kingdom. |
| 1340230 | 12/1973 | United Kingdom. |
| 1359448 | 7/1974 | United Kingdom. |
| 2125780 | 3/1984 | United Kingdom. |

OTHER PUBLICATIONS

"New:Liquid-Process Sodium Silicate", Chemical Engineering, Feb. 5, 1962, pp. 76-78.
Patent Abstracts of Japan, vol. 9, No. 196 (Aug. 13, 1985) 60-65713(A).
Chemical Engineers Handbook, Fifth Edition, 1973, Perry et al., pp. 8-41.

Primary Examiner—Olik Chaudhuri
Assistant Examiner—Ken Horton
Attorney, Agent, or Firm—Cushman, Darby & Cushman

[57] ABSTRACT

Amorphous silica prepared by the gel route requires washing to remove electrolyte. The gel is formed into small particles by shearing and then washed while being transported by water through stages which separate larger size material. The washing is more rapid than conventional methods and allows the ageing steps to be decoupled from the wash stage.

5 Claims, 1 Drawing Sheet

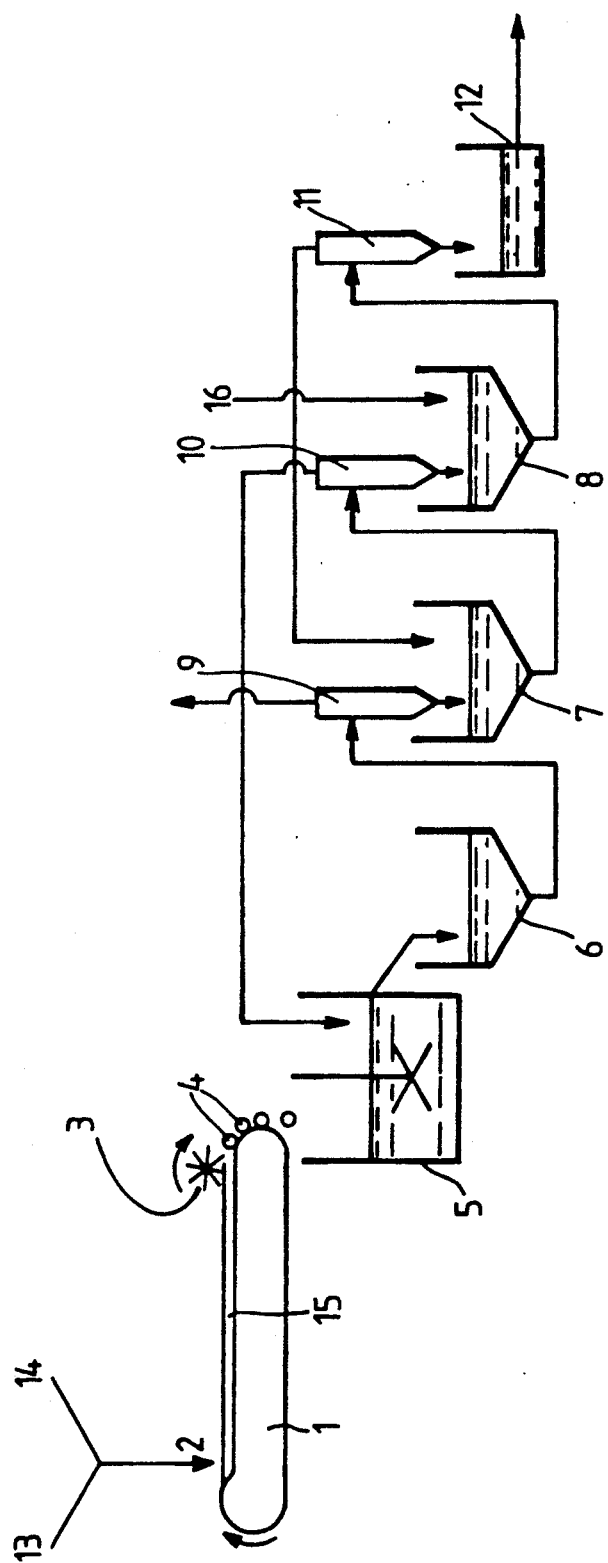

MANUFACTURE OF SILICA GELS USING SHEAR TO REDUCE THE PARTICLE SIZE PRIOR TO WASHING WITH A HYDROCYCLONE

This is a continuation of application Ser. No. 07/331,097, filed on Mar. 27, 1989, which is abandoned and which is a continuation of Ser. No. 07/041,910 filed Apr. 24, 1987, now abandoned.

FIELD OF INVENTION

This invention relates to an improved process for the manufacture of silica hydrogels formed by the gelation of an alkaline silica containing solution.

BACKGROUND TO THE INVENTION

Silica hydrogel is the essential precursor to silica xerogel which is a versatile material for industrial purposes and has a number of industrial applications, for example as an adsorbent, desiccant, catalyst base, toothpaste component, beer clarification, filler and flatting agent in coating compositions. The hydrogel is obtained from a hydrosol formed by acidification of a silica containing solution. The hydrogel is purified by removal of electrolyte and dried to provide a gel with the appropriate pore volume and surface area. After or during washing the hydrogel may be subjected to ageing steps to obtain a range of silica gels with different structures and properties.

The commercially used silica containing material is an alkali metal silicate which may be sodium or potassium silicate, with the former being preferred. The acidification step is usually performed by the addition of a mineral acid, for example sulphuric acid or phosphoric acid with the former being used commercially. In existing technology the hydrogel is prepared by acidifying the alkali metal silicate and allowing this to set to a hydrogel, normally on a moving conveyor approximately from 10 to 25 m in length. This provides sufficient residence time for the gel to gain the required mechanical strength to enable it to be broken into manageable lumps (0.5 to 5 mm in diameter), and also to prevent the broken pieces congealing into large gel masses in the washing vessel.

The hydrogel is broken into pieces by various methods for example allowing it to fall through a grid or passing it through rotating cutter blades. The hydrogel pieces are then washed in water of suitable purity to remove the electrolyte impurities. Normally this washing step is performed in tanks of considerable size, containing 1 to 10 tonnes of hydrogel, and may occupy several hours to obtain efficient leaching of the impurities. The hydrogel is usually washed in hot water, at 60° C. to 80° C., for a period of 6 to 12 hours depending on the residual electrolyte level required in the final product. Alternatively cold water can be used for washing but this increases the washing time by a factor of at least three. Thus the efficient washing of hydrogel on commercial scales requires considerable equipment, energy input for the wash water and a relatively long washing cycle period to reduce the electrolyte content to the required level. The variation in particle size can lead to inconsistent washing and non-uniform pH zones in the gel lump, which in turn, at elevated temperatures can subject the hydrogel to ageing before the washing stage is complete.

For products where a low surface area and high pore volume are required the washed hydrogel is subjected to structural modification by extending this hydrothermally ageing at elevated temperatures, about 90° C., and about neutral pH for long periods of time, i.e. about 6 to 10 hours. After ageing the hydrogel is dried and if required milled to the size for the intended application.

BRIEF DESCRIPTION OF THE FIGURE

The FIGURE illustrates the process used in the examples to produce the silica gel of the invention.

GENERAL DESCRIPTION OF THE INVENTION

The present invention provides a process in which silica hydrogel particles are leached substantially completely of electrolyte impurities in a short washing time.

The process of the present invention derives from the understanding that by forming the silica hydrogel into particles considerably smaller than those disclosed previously, the removal of electrolyte at a washing station can be achieved within a period of a few seconds and, in any case, with a residence time at each contact washing stage to be less than 1 minute. This extremely short period allows the washing operation to be completed in less than 1 minute. The washing conditions can be selected to provide the desired final wash pH or electrolyte content to give silica products with differing properties and thus different applications. The preparation of the gel in a small particle size also allows the subsequent washing cycles to be performed in a water borne system in which the particles are transported and washed while in water suspension.

The hydrogel is preferably produced under acid conditions as described earlier but the process described in this invention can also be used for washing alkaline-set hydrogels. The silica gel of the invention can comprise silica cogelled with a compatible oxide, for example alumina, magnesia and zirconia, and the present process extends to treatment of these materials.

The small hydrogel particles can be formed by many techniques, but the one preferred is to pass hydrogel lumps in suspension with water through the mixing zone of a high shear mixer. The mixer is preferably of the type where a high speed rotor is surrounded by a stator containing a number of holes, e.g. "Unishear", "Silverson" mixers. The mixer may be either of the immersion or in-line type. In order to obtain the required particle size distribution (i.e., minimising levels of fine and coarse particles) from the high shear mixer, the gel must have a lower mechanical strength than that used in the normal process. This negates the requirement for a long time period to build the necessary mechanical strength in the gel, and as a consequence a shorter setting belt can be used, about ½ to ⅓ of the usual length. Thus a gel which would have been left on the belt for 50 minutes to give the desired gel qualities in the normal process require only 20 minutes to gel to provide sufficient strength to allow formation of a slurry by application of shear. With a gel of higher mechanical strength the application of shear produces high levels of fine particles because of the brittle nature of the harder gel and the more severe shearing that is required to give the same mean size.

A residence time of 0.5 to 1 minute in the mixer at a water:hydrogel ratio between 1:1 and 3:1 results in a relatively narrow size distribution.

Under such operating conditions the particle size distribution of the hydrogel in the slurry can be characterised by a weight mean particle size of between about 50 microns and about 200 microns and is dependent upon the energy input to the system and the nature of the bulk hydrogel.

Alternatively, the silicate/acid reaction can be performed by mixing the appropriate solutions and forming the sol directly into particles of the desired size. The gelling step then occurs in the particles and a setting belt is not required. An example of this method is to spray the hydrosol into a chamber containing air or a liquid not compatible with the gel materials, and allow the particles carried in the air or non-compatible liquid to gel before falling to the bottom of the chamber. In such a system, the gel-making conditions have to be modified to shorten the gelation time.

The small particle size of the gel allows the leaching of electrolyte to proceed rapidly to the equilibrium level, which ensures consistent pH within the particle of gel. The rate of washing is rapid even when cold water is used. In the washing process a water/hydrogel ratio of 3 to 4:1 is effective compared with a ratio of 6 to 8:1 for batch washing of larger gel lumps in conventional practice. The rapid washing, even when using hot water, does not result in any significant ageing. Therefore the washing and ageing steps can be decoupled effectively, resulting in a final product which has more consistent properties than that obtained from the normal process.

The preferred means of washing the slurry particles is by means of at least one hydrocyclone. In a hydrocyclone the slurry and wash water are fed tangentially into the upper end of a narrow inverted cone. The water flow follows a primary vortex path downwards adjacent the inner wall. At the bottom end there is a spigot through which pass the coarser particles and a proportion of the wash water. The finer particles follow an upward helical path along the central axis of the cone. This slurry passes out through the overflow at the top of the cone to the next stage of washing.

This device is the preferred means of washing the gel particles in a water bourne system because particle movement and separation is effected by the wash water. It is also possible to wash the particles in a system where separation of the particles carried in the water is effected by means of a centrifungal device.

Surprisingly, it has been discovered that after this rapid washing process the subsequent hydrothermal rearrangement to different structures occurs at a faster rate than after conventional washing. Thus a product which would require 6-8 hours ageing following batch washing is aged satisfactorily after only 1½ to 2½ hours using the washing process disclosed in this invention.

The disclosed process, therefore, provides a reduced process time and plant scale together with improved control and product uniformity.

The invention extends to hydrogels obtained by the process described and xerogels obtained by drying these hydrogels.

EXAMPLES

Examples of the process according to the invention will now be given with reference to the accompanying diagrammatic drawing.

EXAMPLE 1

A suitably sized conveyor belt 1 moves in the direction of the arrow transporting material from a reception station 2 to a cutter 3. Material 4 leaving belt 1 is deposited in a vessel 5 containing a high shear mixer. After processing, material from this mixer stage moves to collection vessels 6, 7 and 8 and is then washed by hydro cyclones 9, 10 and 11. The final washed product is collected in collection vessel 12. Some additional wash water is added to vessel 6 to maintain a balance of water flow through the wash system.

The high shear mixer was a "Unishear" Immersion type "UN5LE", 4KW, 3.75 inch (9.5 cm) diameter 6 blade rotor with tip speed of 2827 feet per minute. The hydrocyclones, which had 2 inch diameter, are obtainable from the Mozley company.

In the manufacture of silica hydrogel an alkaline silica containing solution 13 is mixed with a suitable acid feedstock 14 to form a hydrogel which is then deposited on the belt at station 2. A layer 15 of the mixture is formed on the upper surface of belt 1 and moves to the cutter 13 over a period of about 8 to 25 minutes, during which period the gel forms. The cutter chops the resulting gel into lumps having an average size of one to two centimeters (larger lumps can be used provided they can pass into the shear zone of the mixer and can be kept in suspension) which fall into the high shear mixer 5 where they are reduced to a slurry of particles having a weight mean particle size in the range of 50 micron to 200 micron. The resulting slurry is passed to collection vessel 6 (25 liters) and then pumped to a series of hydrocyclones where it is washed to remove electrolyte by a counter current arrangement with fresh wash water added from source 16. The washed slurry is received by collection vessel 12 from which vessel, after filtering, it is passed to a drier.

Neutral sodium silicate liquor (3.3:1 $SiO_2/Na_2O$ ratio, 25% $SiO_2$) 8.5 liters/minute was mixed with dilute sulphuric acid (40% w/w) 3.4 liters/minute to produce a hydrosol with the composition 18.2% $SiO_2$, 12.3% sodium sulphate and 3% excess sulphuric acid. The sol had a setting time of about 3 to 4 minutes at a temperature of 52° C. and was allowed to set on a continuously moving belt. The dimensions and speed of the belt were such that the mean residence time of the hyrogel on the belt was 10 minutes and its production rate 14.0 Kg/min.

The hydrogel was cut into lumps of about 1 to 2 cm diameter and fed into the vessel containing the high shear mixer. The hydrogel was sheared at 2800 rpm in the presence of liquid recycled from the washing train. The disintegration vessel was operated continuously and the position of the overflow was chosen to give a mean residence time of approximately 30 seconds. The hydrogel slurry was then passed through three washing stages, arranged in series for countercurrent washing.

The slurry was pumped to each hydrocyclone at a rate of 70 Kg/min and 50 psig pressure, where it was split into an underflow stream (20 Kg/min and 50% solids (as hydrogel)) and an overflow stream (50 Kg/min and 2% solids (as hydrogel)).

Wash water (main water supply with 90 ppm soda as $Na_2O$) at a rate of 50 Kg/min was added to the final stage of the train. An additional 7 Kg/min of water was added to the first stage to balance flow in the system.

The hydrocyclones had 14 mm diameter vortex finders and 9 mm spigots.

The weight mean particle size of the product hydrogel stream was 185 micron and its sodium content was 900 ppm as $Na_2O$ (equivalent to 3400 ppm on the dried product).

The surface area of the dried product was typically 500 $m^2/g$ with a nitrogen pore volume of 0.25 $cm^3/g$. When the washed hydrogel slurry was hydrothermally aged after adjusting pH to 7.5 and heating for 1.5 hours at 95° C. then a product with a surface area of 375 m$^2$/g and mecury pore volume of 1.8 cm$^3$/g was obtained after drying.

EXAMPLE 2

An unwashed hydrogel slurry was prepared as in Example I and washed in a train containing 4 hydrocyclone washing stages. The hydrogel feedrate was 12 Kg/min and wash water (main water supply with 90 ppm Na$_2$O) was added at 50 Kg/min. The product hydrogel had a sodium content of 400 ppm as Na$_2$O (equivalent to 1500 ppm on the dried product).

EXAMPLE 3

As example 1, but the hydrogel feedrate was reduced to 7 Kg/min and wash water increased to 55 Kg/min. Because of the more dilute slurry the hydrocyclone spigot diameter was reduced to 6 mm.

The product hydrogel had a sodium content of 220 ppm as Na$_2$O (equivalent to 850 ppm on the dried product)

EXAMPLE 4

As Example 2 but deionised water (negligible sodium content) was used for washing. The hydrogel feedrate was 9 Kg/min and the wash water feedrate was 58 Kg/min. The product hydrogel had a sodium content of 90 ppm as Na$_2$O (equivalent to 350 ppm on the dried product).

I claim:

1. A process for the preparation of a silica hydrogel, that allows for a rapid washing, which comprises:
   i) acidifying an alkaline silica containing solution to form a silica hydrogel in bulk;
   ii) subjecting the gel to shear in aqueous suspension to produce gel particles having a weight mean particle size in the range of 50 to 200 microns;
   iii) washing the particles in a water borne system including at least one hydrocyclone washing step; and
   iv) separating the hydrogel from the wash water.

2. A process according to claim 1 wherein the washing is completed in less than one minute in any hydrocyclone washing step.

3. A process according to claim 2 wherein the wash water:hydrogel ratio is from 3:1 to 4:1.

4. Silica hydrogel formed by the process of claim 1.

5. Silica xerogel obtained from the hydrogel of claim 3.

* * * * *